(12) United States Patent
Dickens et al.

(10) Patent No.: US 12,441,053 B1
(45) Date of Patent: Oct. 14, 2025

(54) SYSTEM AND METHOD OF OPTIMIZING ADHESION DYNAMICS DURING DEPOSITION OF THERMOPLASTIC MATERIALS

(71) Applicant: Florida A&M University, Tallahassee, FL (US)

(72) Inventors: Tarik J. Dickens, Tallahassee, FL (US); Sean Psulkowski, Fernandina Beach, FL (US); Charissa Lucien, Tallahassee, FL (US); Mingchia Dawn Yang, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 0 days.

(21) Appl. No.: 17/655,276

(22) Filed: Mar. 17, 2022

Related U.S. Application Data

(60) Provisional application No. 63/200,651, filed on Mar. 19, 2021.

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/245* (2017.08);
(Continued)

(58) Field of Classification Search
CPC ....... B29C 64/00; B29C 64/10; B29C 64/118; B29C 64/386; B29C 64/393;
(Continued)

(56) References Cited

U.S. PATENT DOCUMENTS

| | | | |
|---|---|---|---|
| 10,974,444 B1 * | 4/2021 | Ahmed | B29C 64/295 |
| 2016/0098824 A1 * | 4/2016 | Fry | G06F 18/22 |
| | | | 700/108 |

(Continued)

OTHER PUBLICATIONS

P. M. Martin, Ed., "Chapter 1—Deposition Technologies: An Overview," in Handbook of Deposition Technologies for Films and Coatings (Third Edition), Boston: William Andrew Publishing, 2010, pp. 1-31.

(Continued)

*Primary Examiner* — Andrew L Swanson
(74) *Attorney, Agent, or Firm* — Owen G. Behrens; Smith & Hopen, P.A.

(57) ABSTRACT

A device and related methods for determining adhesion dynamics of the rapid deposition of a filament is disclosed herein. The device includes a stage having a top surface. An aperture residing within the top surface of the stage is disposed within a first plane. A thermally transparent film is stretched across the aperture and secured under tension. The thermally transparent film resides within a second plane that is parallel to the first plane and is configured to facilitate the transmission of infrared waves through the transparent film. A thermal camera is disposed in underlying relation to the thermally transparent film and is configured to collect a thermal signature of the filament being extruded by a nozzle. A digital microscope is disposed in an orthogonal relationship with the print path. The digital microscope is configured to capture video data during the extrusion of the filament being deposited on the stage.

9 Claims, 14 Drawing Sheets

(51) Int. Cl.
| | |
|---|---|
| B29C 64/245 | (2017.01) |
| B29C 64/314 | (2017.01) |
| B29C 64/321 | (2017.01) |
| B29C 64/393 | (2017.01) |
| B33Y 10/00 | (2015.01) |
| B33Y 30/00 | (2015.01) |
| B33Y 40/10 | (2020.01) |
| B33Y 50/02 | (2015.01) |
| B33Y 70/00 | (2020.01) |
| B29K 67/00 | (2006.01) |

(52) U.S. Cl.
CPC .......... *B29C 64/314* (2017.08); *B29C 64/321* (2017.08); *B29C 64/393* (2017.08); *B33Y 10/00* (2014.12); *B33Y 30/00* (2014.12); *B33Y 40/10* (2020.01); *B33Y 50/02* (2014.12); *B33Y 70/00* (2014.12); *B29K 2067/046* (2013.01)

(58) Field of Classification Search
CPC ........ B29C 64/245; B29C 64/106–118; B33Y 10/00; B33Y 30/00; B23B 23/08
See application file for complete search history.

(56) References Cited

U.S. PATENT DOCUMENTS

| | | | | |
|---|---|---|---|---|
| 2017/0157910 | A1* | 6/2017 | Sumikawa | B32B 38/10 |
| 2019/0329499 | A1* | 10/2019 | Parangi | B22F 10/80 |
| 2019/0358907 | A1* | 11/2019 | Starkey | B29C 64/118 |
| 2020/0041948 | A1* | 2/2020 | Katsuta | G06F 3/1278 |
| 2020/0047402 | A1* | 2/2020 | De Backer | B29C 64/118 |
| 2020/0133182 | A1* | 4/2020 | Haik | G05B 13/027 |
| 2021/0162662 | A1* | 6/2021 | Kothari | B29C 64/393 |

OTHER PUBLICATIONS

Zhengyang Cai et al. "Chemical Vapor Deposition Growth and Applications of Two-Dimensional Materials and Their Heterostructures" Chemical Reviews, Jan. 31, 2018, pp. 6091-6133 vol. 118.

Yasser Zare et al. "Analysis of complex viscosity and shear thinning behavior in poly (lactic acid)/poly (ethylene oxide)/carbon nanotubes biosensor based on Carreau-Yasuda model" Results in Physics. (13) 2019, pp. 1-8.

A.C. Abbott et al. "Process-structure-property effects on ABS bond strength in fused filament fabrication" 19 Additive Manufacturing. 2018, pp. 29-38.

G. D. Goh et al. "Process-Structure-Properties in Polymer Additive Manufacturing via Material Extrusion: A Review" Critical Reviews in Solid State and Materials Sciences. Jan. 24, 2019. pp. 1-21.

"HiPerGator—Research Computing—University of Florida." https://www.rc.ufl.edu/about/hipergator/ (last accessed Jan. 17, 2023).

Jolie Frketic et al. "Automated Manufacturing and Processing of Fiber-Reinforced Polymer (FRP) Composites: An Additive Review of Contemporary and Modern Techniques for Advanced Materials Manufacturing" Additive Manufacturing, 2017 pp. 1-62.

Ben Redwood et al. "The 3D Printing Handbook" 2017 pp. 1-347. 3D Hubs.

Jamison Go et al. "Rate limits of additive manufacturing by fused filament fabrication and guidelines for high-throughput system design" Addictive Manufacturing. 2017 pp. 1-24.

Varun Srinivas et al. "Promotion of molecular diffusion and/or crystallization in fused deposition modeled poly(lactide) welds" Polymer. 2020, pp. 1-8. 202.

Hardikkumar Prajapati et al. "Measurement of Anisotropic Thermal Conductivity and Inter-Layer Thermal Contact Resistance in Polymer Fused Deposition Modeling (FDM)" Additive Manufacturing. 2018, pp. 1-26.

Claire McIlroy "A fundamental rule: Determining the importance of flow prior to polymer crystallization" Phys. Fluids 31, 113103, Nov. 21, 2019.

Huanxiong Xia et al. "A numerical study of the effect of viscoelastic stresses in fused filament fabrication" Comput. Methods Appl. Mech. Engrg. 346 (2019) 242-259.

G D Kim et al. "A benchmark study on rapid prototyping processes and machines: quantitative comparisons of mechanical properties, accuracy, roughness, speed, and material cost" Proceedings of the Institution of Mechanical Engineers, Part B: Journal of Engineering Manufacture. 2008, 222: pp. 201-215.

John R. Tumbleston et al. "Continuous liquid interface production of 3D objects" Sciencexpress. Mar. 16, 2015. pp. 1-7.

C. McIlroy et al. "Disentanglement Effects on Welding Behavior of Polymer Melts during the Fused-Filament-Fabrication Method for Additive Manufacturing" Cond-Mat, Mar. 29, 2017. pp. 1-17. Available: http://arxiv.org/abs/1703.09295.

Daniel P. Cole et al. "Interfacial mechanical behavior of 3D printed ABS" Journal of Applied Polymer Science. 2016. pp. 1-12.

Huanxiong Xia et al. "Fully Resolved Numerical Simulations of Fused Deposition Modeling. Part I—Fluid Flow" ArXiv171105940 Phys., Nov. 2017. Available: http://arxiv.org/abs/1711.05940.

C. McIlroy et al "Modelling flow-enhanced crystallisation during fused lament fabrication of semi-crystalline polymer melts" Additive Manufacturing. Oct. 5, 2018, pp. 1-20.

Diederik P. Kingma et al. "Adam: A Method for Stochastic Optimization," ArXiv14126980 Cs, Jan. 2017. Available: http://arxiv.org/abs/1412.6980.

G.R. Berger et al. "On the Use of Interfacial Tension Parameter to Predict Reduction of Friction by Mold Coatings in Injection Molding of Polyamide 6" American Institute of Physics. 2016, pp. 020006-1-020006-5.

Q. Zhao et al. "Effect of temperature on the surface free energy of amorphous carbon films" Journal of Colloid and Interface Science. Aug. 2004. 280: pp. 147-183.

Timothy J. Coogan et al. "Modeling of interlayer contact and contact pressure during fused filament fabrication" Journal of Rheology. Jun. 18, 2019, 63: 655-672.

Martin Spoerk et al. "Optimisation of the Adhesion of Polypropylene-Based Materials during Extrusion-Based Additive Manufacturing" Polymers. May 2, 2018. pp. 1-16, 10, 490.

Gerald R. Berger et al. "A study on the role of wetting parameters on friction in injection moulding" Int. J. Materials and Product Technology. 2016, vol. 52, pp. 193-211.

C.A. Fuentes et al. "Predicting the adhesion strength of thermoplastic/glass interfaces from wetting measurements" Colloids and Surfaces A: Physicochem. Eng. Aspects. 2018, pp. 1-24.

Woo II Lee et al. "A Model of the Manufacturing Process of Thermoplastic Matrix Composites" Journal of Composite Materials. Nov. 1987, vol. 21, pp. 1017-1055.

Michael Arthur Cuiffo et al. "Impact of the Fused Deposition (FDM) Printing Process on Polylactic Acid (PLA) Chemistry and Structure" Applied Sciences. 2017, 7: 1-14.

Xunfei Zhou et al. "Experimental and numerical investigation of the thermal behaviour of polylactic acid during the fused deposition process" Virtual and Physical Prototyping. 2017, pp. 1-13.

Pierre Erwan Le Marec et al. "Modelling of PLA melt rheology and batch mixing energy balance" European Polymer Journal. 2014, 60: 273-285.

Koohyar Pooladvand et al. "Computational and Experimental Characterization of 3D Printed Components by Fused Deposition Modeling" Mechanics of Additive and Advanced Manufacturing. 2019, vol. 8, pp. 87-95.

Jonathan E. Seppala et al. "Infrared thermography of welding zones produced by polymer extrusion additive manufacturing" Additive Manufacturing. May 20, 2016, pp. 1-8.

E. Ferraris et al. "Thermography based in-process monitoring of Fused Filament Fabrication of polymeric parts" CIRP Annals—Manufacturing Technology 68 (2019) 213-216.

Jolie Breaux Frketic et al. "Dexterous Printing and Fabrication of Multi-Functional Parts: Design for Science and Engineering Education" Procedia Manufacturing 10 ( 2017 ) 1087-1096.

Arup Dey et al. "A Systematic Survey of FDM Process Parameter Optimization and Their Influence on Part Characteristics" Journal of Manufacturing and Materials Processing. 2019, 3, 64.

(56) References Cited

OTHER PUBLICATIONS

Ognjan Luzanin et al. "Impact of processing parameters on tensile strength, in-process crystallinity and mesostructure in FDM-fabricated PLA specimens" Rapid Prototyping Journal. 2019, pp. 1398-1410.

* cited by examiner

SYSTEM AND METHOD OF OPTIMIZING ADHESION DYNAMICS DURING DEPOSITION OF THERMOPLASTIC MATERIALS

CROSS-REFERENCE TO RELATED APPLICATIONS

This nonprovisional application claims priority to provisional application No. 63/200,651, entitled "Device and methods for determining adhesion dynamics under rapid deposition of thermoplastic materials," filed on Mar. 19, 2021, by the same inventors.

BACKGROUND OF THE INVENTION

1. Field of the Invention

This invention relates, generally, to additive manufacturing. More specifically, it relates to a system and method for optimizing the adhesion dynamics of a filament, such as one made from one or more thermoplastic materials, during additive manufacturing.

2. Brief Description of the Prior Art

Advanced processes such as atomic deposition, chemical vapor deposition (CVD), soldering and welding, and other controlled formative processes take advantage of simple immutable substrate-material dynamics. Additive manufacturing (AM), also known as 3D-Printing (3DP), consists of successive extrusion-based deposition procedures in a layer-by-layer assembly. Material layers are processed to produce the next layer until a final geometric structure is achieved. The initial material deposition onto a substrate is essential in the fabrication of structural and functional parts ("parts"). The rate at which a material is deposited and processed to produce the parts is axiomatic in defining the additive process.

Historically, 3DP has been a continuous process in which layer-adhesion depends on the solidity of the previous layers. Extrusion-based printing methods, such as Fused Filament Fabrication (FFF), Material Extrusion (MatEx), or Fused Deposition Modeling (FDM), are widely accepted as the most accessible method of AM. During extrusion-based printing methods, the initial deposition and subsequent adhesion of the extrudate accounts for a relatively small portion of the printing process.

However, unlike its modern plastic processing counterpart injection molding, 3DP has not achieved the volumetric precision for full-scale adoption. Specifically, most AM processes are designed to fabricate entire layers simultaneously (e.g., SLA-DLP), and therefore larger volumes can be produced which in turn reduces build times.

Additional types of AM frequently utilize start and stop operations of the processing apparatus and precise control through an inherent support system. For example, powder bed fusion (PBF) systems are initiated by a powered laser interacting with surface layers of randomly spread powder. Subsequent layers of free powders intrinsically support the melt pool initiated by the traversing laser on the powder bed tray. This allows PBF systems to create near defect-free fused layers.

In contrast, with the deposition of thermoplastic filaments and polymer ink extrusions, the polymer undergoes thermo-temporal transitions that influence the final state and material phase without providing the constraints of a stable embedded support. In addition, the build rate performance of commercially available fused fabrication processes has rate-limited speeds of 0.1 m/s. Accordingly, a solution utilizing a fast extrusion method involves a laser configured to rapidly melt and place material under controlled x-y deposition.

Additionally, the resolution of the z-layer height significantly affects build rates and processing times. In effect, the FFF process experiences lower internal temperatures in the liquefier phase at faster deposition rates. This results in potential fluctuations in polymer morphology. The successive layering of the partially melted and in-state crystalizing material controls the geometric resolution and quality conditions of the part. This makes predicting final part quality difficult given the uncertain process conditions and is a challenge for future AM adoption.

To be competitive with traditional manufacturing processes, speeds of 0.5-1.0 m/s and 100-200 $cm^3$/hr. build rates are required. When manufacturing the first deposited layer has the most significant effect on the quality of the produced structure. Under the time constraints of the initially deposited extrudate, the material will adhere at once to the substrate to allow for further printing toward complete build geometries. However, there exists a lack of research and disinterest in the research regarding first layer dynamics. Moreover, as AM technology scales to meet industrial manufacturing needs, initial failure in the first layer can derail the construction of the entire part geometry.

Additionally, printing with speeds in the range of fused deposition can introduce the potential for inadequate first layer adhesion due to competing thermal conditions, Inadequate first layer adhesion can cause profound defects that render the production to be ultimately useless (e.g., stringing). For example, inadequate first layer adhesion can lead to significant dimensional inaccuracies across a printed component; warping and delamination can occur from inconsistent heat propagation caused by uneven contact between the first layer and print bed; and an entire failed print can result due to lack of an initial track down where, if not caught early, the print head will drag the extrudate across the surface of the bed forming a mass of plastic waste.

These operational defects present significant technical challenges when adopting MatEx as industrial technology requires active mitigation. Moreover, the impact of controlled deposition can affect applications in dispensing complex polymer systems, such as liquid crystal polymers, hydrogen, printed conductive inks for interconnects, etc. Due to the freeform complexity of MatEx, the rise of robotic-assisted AM (which can be referred to as RA-AM 3DP) invites inline sensing, flexibility/dexterity, and active control schemes to facilitate active mitigation for part production.

Additionally, FDM is known for its selective placement at moderate speeds ranging from 50 to 150 mm/s and is prone to initial failure. The processing speeds of FDM are dramatically lower than other systems, such as LOM (laminated object manufacturing) or CLIP (continuous liquid interface production). Specifically, higher speeds FDM causes stretching and morphological differences in the polymer chains. However, more expedient selective deposition is needed for FDM to become a functional processing tool for industrial applications.

The predominant mode of consolidation in FDM involves a two-step coalescing process based on 1) the dynamics of the initial contact and 2) neck growth both of which determine shape features throughout the deposition process. Furthermore, the viscoelasticity of polylactic acid (PLA)

affects the exiting conditions resulting in potential die-swelling, which leads to a reduction in flowability. This reduction cases accumulation of the molten polymer and high inconsistencies across the printed lines resulting in manufacturing inconsistencies in the part.

Dictating the thermal laydown process consists of several significant thermal processes. These thermal processes influence the convection and affection conditions surrounding the nozzle and build platform. In a region denoted the "stand-off region," the fluctuating temperature distribution profile has adverse effects on the cooling regime, in effect the heat transfer between deposited material and substrate. These conditions can also affect the bonding between adjacent deposited lines or roads. Recent studies on the welding capabilities of PLA utilized an ultrathin thermocouple to observe the passing nozzle and material deposition's temperature profile, revealing rapid solidification [10]. If the initial conditions of the material morphology and the thermal conditions are considered, a more accurate description of process conditions for "tack down" and continued deposition will aid fundamental understanding in mechatronic extrusion-based (RA-AM) 3DP.

However, the attempts in the prior art fail to adequately consider and optimize thermodynamic qualities of an additive manufacturing system to optimize adhesion success for a filament on a print bed. Accordingly, what is needed is system and method of optimizing adhesion dynamics during an additive manufacturing process, such as by determining an optimal characteristic length required for successful substrate adhesion and the conditions for rapid adhesion and deposition with particular attention to the thermodynamics behind spatial morphology of forming the initial extrudate (developing an iris onto the substrate), encompassing vertical deposition, and the thermodynamics of initial traction. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions: or is known to be relevant to an attempt to solve any problem with which this specification is concerned.

BRIEF SUMMARY OF THE INVENTION

The long-standing but heretofore unfulfilled need for system and method of optimizing adhesion dynamics during an additive manufacturing process is now met by a new, useful, and nonobvious invention.

The novel system includes a nozzle in communication with an additive manufacturing device including an amount of filament. In an embodiment, a robotic arm secures the nozzle to the additive manufacturing device. The nozzle is configured to receive the amount of filament from the additive manufacturing device for extrusion therefrom. In an embodiment, the filament is made of a 100 wt. % polylactic acid. A print bed is disposed beneath the nozzle. The print bed includes a section of a thermally transparent thin film, such that the nozzle is aligned perpendicular to the section of the thermally transparent thin film of the print bed. In an embodiment, the section of the thermally transparent thin film of the print bed measures approximately 0.5 $m^2$ in area. In an embodiment, the thermally transparent thin film of the print bed is made of a cellulose acetate 100 wt. % coated polyester film.

An optical capture device is disposed above the print bed and beneath the nozzle. The optical capture device is oriented orthogonally to the print bed. The optical capture device is configured to capture image-based feedback of the extrusion of the amount of filament from the nozzle to the print bed, thereby capturing adhesion dynamics during deposition of the filament onto the print bed. In an embodiment, the optical capture device is a digital microscope. The digital microscope includes a capture rate of thirty frames per second with an associated resolution of 5 megapixels for each frame.

A thermal capture device is disposed beneath the print bed. The thermal capture device is oriented within a sagittal plane of the print bed, such that the thermal capture device is aligned perpendicular to the section of the thermally transparent thin film of the print bed. The thermal capture device is configured to capture thermodynamic feedback of the extrusion of the amount of filament from the nozzle to the print bed, thereby capturing adhesion dynamics during deposition of the filament onto the print bed. In an embodiment, the thermal capture device is a forward-looking infrared camera. The forward-looking infrared camera includes a capture rate of sixty frames per second with an associated resolution of 320×240 pixels.

The novel method includes a step of capturing image-based feedback from an optical capture device disposed above a print bed and beneath a nozzle that is associated with an additive manufacturing device, with the optical capture device being oriented orthogonally to the print bed. Thermodynamic feedback is captured from a thermal capture device disposed beneath the print bed, the thermal capture device oriented within a sagittal plane of the print bed, such that the thermal capture device is aligned perpendicular to a section of a thermally transparent thin film of the print bed. The thermodynamic feedback includes an above-print bed transition temperature and a tunable critical temperature. The method includes a step of calculating a characteristic length for adhesion of the filament deposition of the additive manufacturing process, with the characteristic length for adhesion being based on an area of the filament deposition on the print bed, the above-print bed transition temperature, and the tunable critical temperature. The characteristic length for adhesion describes a percentage of filament that acts against the print bed prior to a forward translation of the filament during the additive manufacturing process. The method includes a step of optimizing the adhesion dynamics during filament deposition based on the calculated characteristic length for adhesion by adjusting a distance between the nozzle and the print bed.

In an embodiment, the method includes a step of, for each frame captured by the thermal capture device, calculating a temperature of the filament and fitting each temperature to a calibration curve to account for radiation loss through the thermally transparent thin film of the print bed. A thermospatial binning may be calculated for each pixel within each frame captured by the thermal capture device by mapping an each of each pixel with respect to a diameter of the nozzle, thereby measuring deposition plume growth of the filament on the print bed. In addition, an eccentricity may be calculated for each pixel within each frame captured by the thermal capture device by fitting each pixel within a temperature band to an ellipse including bands spaced about by approximately ±2° C.

An object of the invention is to optimize adhesion dynamics during an additive manufacturing process by obtaining optical and thermal images during the process on a transparent print bed, thereby providing real-time feedback related to a successful, partially successful, and unsuccessful adhesion of filament to the print bed.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
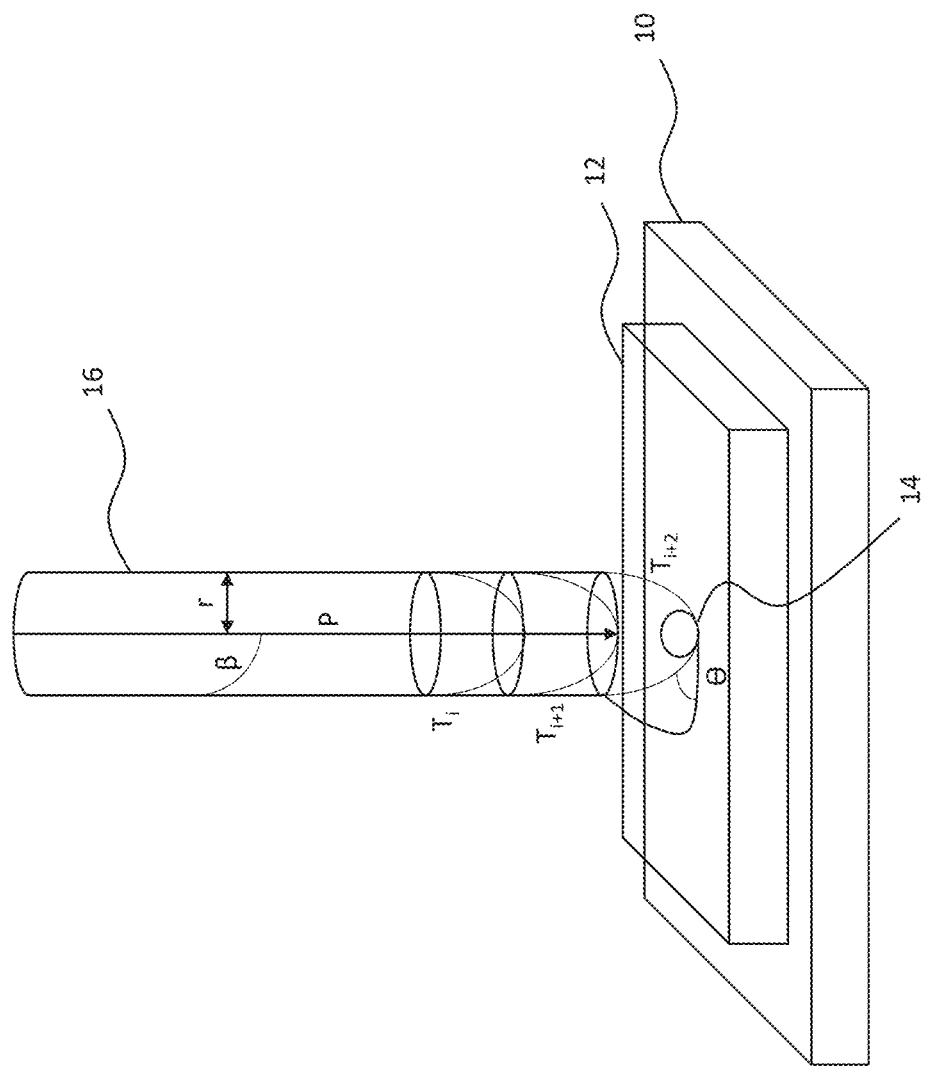
FIG. 1 depicts an orthogonal view of a system for determining adhesion dynamics of a filament during rapid deposition, in accordance with an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

All numerical designations are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined. As used herein, the term "about" refers to ±10% of the numerical; it should be understood that a numerical including an associated range with a lower boundary of greater than zero must be a non-zero numerical, and the term "about" should be understood to include only non-zero values in such scenarios.

As used herein, "capture device" includes, but is not limited to, any device that is capable of recording and transmitting visual data in the form of one or more frames within a field of vision, such as an optical electronic device, an infrared device, an infrared sensor, a thermal sensor, a motion sensor, a laser, a radar, a similar device, and combinations thereof.

The present invention includes a system and method of optimizing adhesion dynamics for a filament during an additive manufacturing process. The optimization system and method are designed to identify a characterization scheme (including filament characteristics, temperatures, and nozzle heights) in which thermo-morphological properties along the interface between a print bed and a nozzle can determine a "pass/fail" criteria of thermoplastic adhesion for high throughput manufacturing. In particular, the optimization system and method utilize posterior imaging techniques to observe, analyze, and report thermodynamic characteristics of adhesion attempts for the initial layer and material-substrate interface during a filament-based additive manufacturing process. The optimization system and method will be described in greater detail in the sections herein below.

In general, various boundary conditions are invoked during the contact of a material on a surface, such as the deposition/extrusion process during additive manufacturing projects. During deposition/extrusion, the molten or fluidic material system comes into contact with a surface, resulting in three possible situations: (1) a complete slip, in which the molten or fluidic material fails to bind to the surface, resulting in an undesirable printing attempt; (2) a partial slip, in which at least a portion of the molten or fluidic material fails to bind to the surface, resulting in a non-compliant printing attempt; and (3) a no-slip scenario, resulting in a successful binding between the molten or fluidic material and the surface. Therefore, adhesion can be defined loosely under the conditions of a "no-slip" contact model. As related to friction, forces, and temperature in the process, the surface conditions strongly influence the deposition operation, referred to as a "tack down" of the material on the print bed, resulting in the instantaneous stop-flow condition of the softened material state upon the print bed. Residual stresses of the extrudate are a significant determinant of the material bead's successful adhesion to the print bed and subsequent structure.

As shown in FIG. 1, substrate 12 is disposed atop print bed 10, with nozzle 16 disposed at a position above substrate 12, such that a space exists between nozzle 16 and substrate 12. During an embodiment of an additive manufacturing process, a molten extrudate exits nozzle 16 in a direction toward print bed 10, such that droplet (or iris) 14 is formed on substrate 12. Iris 14 is the largest contributing factor towards the extrudate's successful initial adhesion to substrate 12. Iris 14 includes an associated volumetric unit upon contact with substrate 12, which can be described as $v_{drop}$ and expressed through Young's equation (which expresses the morphological properties corresponding to adhesion between iris 14 and substrate 12 by surface energy). The contact area of iris 14, which, in an embodiment, is a spherical drop of contact radius r and height h is described in Eq. 1:

$$A = \pi r^2 = \pi^{\frac{1}{3}}\left[\frac{6V}{\theta_0(3+\theta_0^2)}\right]^{\frac{2}{3}} \quad (1)$$

where contact angles range between $0 \leq \theta_0 \leq 180$; and where t is a function of $\theta_0$ represented as $t=\tan(\theta_0/2)=h/r$. Similarly, the volume of the spherical segment of iris 14 is described in Eq. 2:

$$V = \frac{\pi h(3r^2 + h^2)}{6} \quad (2)$$

The area increases as $\theta_0$ decreases, at constant V, signaling that decreasing $\theta_0$ results in better coverage (or wetting). This initial contact area is the prime solid-body acted on by the work of adhesion, which can be expressed through Eq. 3:

$$\gamma_{12} = \sigma_1 + \sigma_2 - 2\left(\sqrt{\sigma_1^D \sigma_2^D} + \sqrt{\sigma_1^P \sigma_2^P}\right) \quad (3)$$

where the interfacial tension $\gamma_{12}$ describes the area between two immiscible phases (i.e., solid and liquid), $\sigma_1$ and $\sigma_2$ are the free energies between phase 1 and 2, respectively, and superscripts D and P denote the dispersive and polar fractions for each phase.

In practice, operational conditions for the MatEx process contribute to the formulation of $\gamma_{12}$, and therefore, the effective adhesion between the extrudate and surface. Initially, temperature has measurable effects on the dispersive and polar fractions of surface free energy, with lower temperatures resulting in higher total surface free energy [22]. This is expressed as extrudate temperature upon exit of the nozzle. The proximity of the nozzle's exit to the print bed drives the extrudate's contact pressure and morphology onto the substrate (i.e., "layer height"). Predictive modeling has successfully related layer height to contact pressure and cohesive bond strength in MatEx [23]. Similarly, a shear test of varying initial layer heights concluded adhesion force and layer thickness to be inversely proportional while establishing a method to qualify MatEx adhesion [24], which is expressed as nozzle height. The thermoplastic material interaction with the mating surface largely determines adhesion dynamics. Combining the lessons of this section, higher static friction coefficients are measured among matting partners with lower interfacial tension [25], which is expressed as surface treatment.

Referring again to FIG. 1, an embodiment of the adhesion phenomena between the extrudate (via iris 14) and surface (substrate 12) is shown in detail. As shown in FIG. 1, a first zone resides within nozzle 16, and a second zone exists between nozzle 16 and substrate 12. As shown in FIG. 1, r is the inner radius of the nozzle, P is the pressure of the extrudate, and $\tau_{xy}$ is the shear of the extrudate at the wall of the nozzle. In addition, the velocity field of the extrudate within nozzle 16 adhering to the rheological properties of the material labeled as $\beta$ can be described as $v_{noz}$. The transition from zones 1 to 2 illustrates initial contact between the extrudate and substrate 12, and subsequent deposition onto substrate 12 via iris 14, where $\theta$ is the wetting angle and the interfacial area of iris 14 is expressed in Eq. 1. The velocity in this frame is generalized by the translational speed of the nozzle's head across substrate 12 (which can be described as $v_{head}$) and the local zone of interest is the hemispheric volume $v_{drop}$ at the substrate interface (i.e., iris 14). The shear of the thermoplastic extrudate to substrate 12 is $\tau_{xz}$ and governed by crystallization and temperature. The polymer deformation and movement towards the substrate across different timestamps, referred to as $T_i$, $T_{i+1}$, and $T_{i+2}$ in FIG. 1.

For adhesion to occur at a first layer site, solidification must provide the necessary conditions for the polymer material to anchor to the substrate surface, given the interaction of the surface energy. This should follow a combinatorial process explained by friction models and Young's equation for wetting phenomena. Given a substrate with surface energy, $\gamma_s$, and commensurate friction coefficient concerning the applied shear across the surface, a relational condition is developed. Potential thermoplastic-substrate interaction is presented as a three-part conditional function towards full adhesion, semi-adhesion, and no adhesion.

Figure 4:
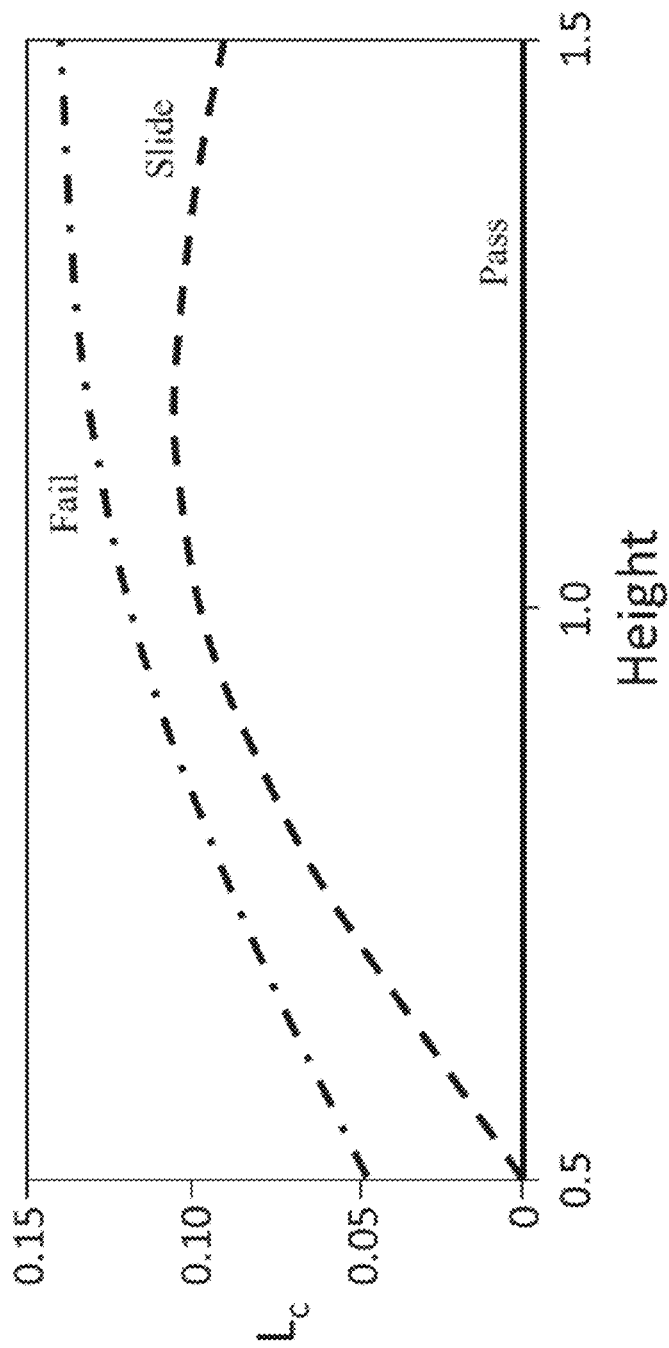
FIG. 4 graphically depicts a pass rate, fail rate, and slide rate for a filament based on a nozzle height and a characteristic length for adhesion, $L_c$, of the filament, in accordance with an embodiment of the present invention.

A characteristic length parameter, $L_c$, was experimentally derived to describe the relationship between contact area, pressure, viscosity, material state, and temperature at the time of initial deposition. $L_c$ is the radial difference in millimeters between the extrudate's molten core and solid exterior to describe temperature effects towards interfacial tension. The measurement of $L_c$ is performed at the point of contact before translation of the filament and is subject to nozzle height, increasing the diameter of the molten pool. Given the importance of a successful initial deposition, assuming the extrusion process leading to translation is isothermal would be insufficient [23]. As such, a characterization scheme was identified in which thermo-morphological properties along the interface can determine a "pass/fail" criteria of thermoplastic adhesion for high throughput manufacturing, as will be described in detail below and which is shown in FIG. 4.

Figure 2:
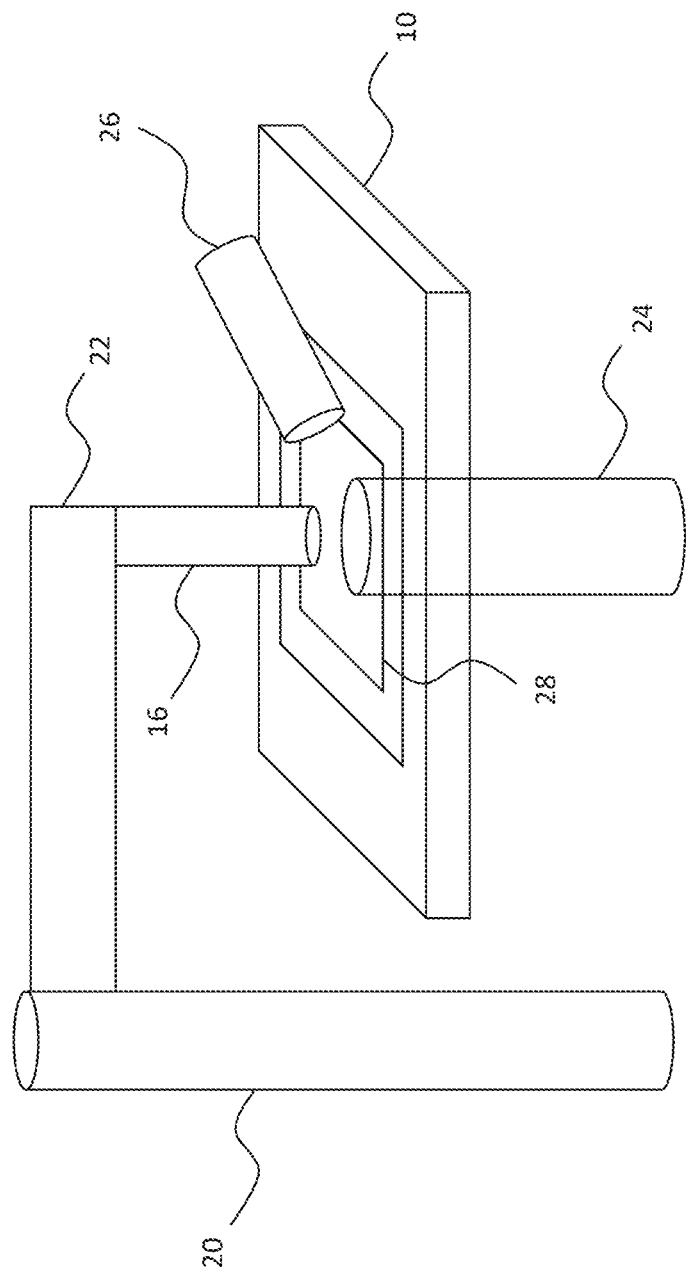
FIG. 2 depicts a close-up orthogonal view of a deposition and adhesion system as shown in FIG. 1, in accordance with an embodiment of the present invention.

Referring now to FIG. 2, an embodiment of the optimization system includes additive manufacturing machine 20 including robotic arm 22 (such as a selective compliance articulated robotic arm, or SCARA) in communication with nozzle 16, which is disposed above print bed 10. Print bed 10 includes a section of thermally transparent thin film 28 which is held under tension. Thermal capture device 24 is disposed beneath print bed 10 and directed such that a capture element of thermal capture device 24 is orientated perpendicularly with respect to thermally transparent thin film 28 within a sagittal plane with respect thereto. In addition, optical capture device 26 is disposed above print bed 10 and is directed such that a capture element of optical capture device 26 is oriented orthogonally with respect to a printing surface disposed on thermally transparent thin film 28. In an embodiment, thermally transparent thin film 28 measures approximately 0.5 m² in area. Accordingly, through thermal capture device 24 that is disposed in the sagittal plane of thermally transparent thin film 28 and through optical capture device 26 that is disposed orthogonally with respect to thermally transparent thin film 28, in-depth capture analyses of both thermal and optical characteristics of print bed 10 and a printed substrate can be obtained for feedback into an optimization model, which will be described in detail below.

Figure 3:
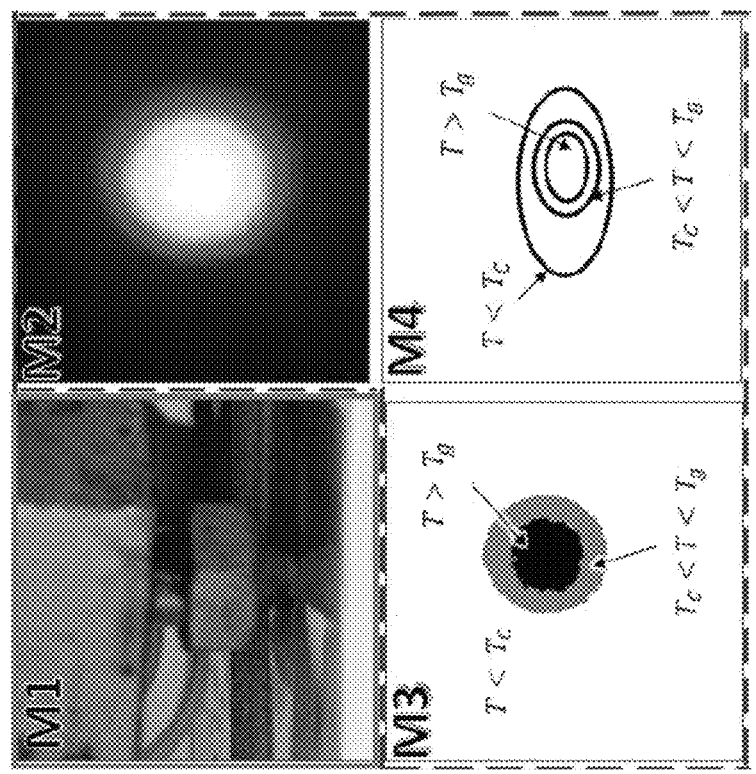
FIG. 3 depicts an image of filament deposition from the system of FIG. 1 as captured by a digital microscope (in section M1); a raw heatmap depicting filament deposition from the system of FIG. 1 as captured by an infrared capture device (in section M2); a graphical depiction of spatial-temporal binning experienced during the rapid filament deposition of the system of FIG. 1 (in section M3) and a graphical depiction of eccentricity of temperature bands experienced during the rapid filament deposition of the system of Fi. 1 (in section M4).

As shown in FIG. 3, embodiments to the system can be evaluated in different ways resulting from the different capture devices utilized in the optimization system. For example, a visual imagery feedback can be captured via optical capture device 26, as shown in section M1 of FIG. 3, with M1 representing a first method of monitoring an additive manufacturing process for optimization. In an embodiment, optical capture device 26 used in the optimization system operates at a capture rate of 30 fps (frames per second) and has an associated resolution of 5 megapixels. In an embodiment, optical capture device 26 establishes the baseline for the pass/fail criterion for operation of the additive manufacturing process.

Similarly, a thermal imaging feedback can be captured via thermal capture device 24, as shown in section M2 of FIG. 3, with M2 representing a second method of monitoring an additive manufacturing process for optimization. In an embodiment, thermal capture device 24 operates at 60 fps and has an associated resolution of 320×240 pixels, with thermal capture device 24 undergoing a thermocouple calibration to offset emissivity fluctuations induced from the thin film substrate or hot end of the additive manufacturing process.

Moreover, the raw values captured via thermal capture device 24 can be resolved into two distinct methods for further analysis and optimization of the additive manufacturing system and process. Specifically, section M3 of FIG. 3 represents a third method of monitoring an additive manufacturing process for optimization through thermal binning. Similarly, section M4 of FIG. 3 represents a fourth method of monitoring an additive manufacturing process for optimization through an eccentricity analysis. For each of methods M3 and M4, an experimental response stemming from thermal capture device 24 and optical capture device 26 facilitates categorizing individual runs between the complete slip, partial slip, and no-slip conditions of the filament on print bed 10. Individual frames captured during the additive manufacturing process provide morphological data of the thermoplastic fluid, making contact with substrate 12 and providing spatial-temporal insight into the heated nozzle 16 under operation. Substratum thermography provided foundational data based on thermal readings of the extrudate during initial deposition onto print bed 10. Observed in an 8 mm by 6 mm field of view, each pixel corresponds to the radiation of a voxelized deposition procedure. Each frame's temperatures are fitted to a calibration curve from experimentally derived constants to account for potential radiation loss through the transparent acetate film, at 99% confidence. Each of methods M3 and M4 will be described in greater detail herein below.

Referring to method M3 for a thermal binning analysis, thermo-spatial binning is defined by the summative process starting at individual pixels at the highest temperatures, where the pixel's area is mapped in reference to nozzle diameter to measure deposition plume growth. Then, the process is reinitialized for individual frames and relates to the temperature of importance to the extrusion process's spatial effects. As shown in FIG. 3, three critical temperatures can be determined from an analysis of the feedback from thermal capture device 24: the above-glass transition temperature $T_g$; temperatures that are below $T_g$ and above a critical temperature $T_c$; and temperatures that are below $T_c$.

Referring to method M4 for an eccentricity analysis, eccentricity is the measured planar shape variation from circularity, in which case pixels of thermal readings within a specific temperature band ranging from ±2° C. inclusively are fitted to an ellipse. The morphology of the temperature bands is expressed in Eq. 4, where e is the eccentricity metric $$e\sqrt{1-\left(\frac{b}{a}\right)^2} \tag{4}$$

where a and b are the ellipsoidal width and height, respectfully. Similar to the method of M3, the analysis under M4 facilitates an uncontaminated method to express morphological change by three ellipses: the above-glass transition temperature $T_g$; temperatures that are below $T_g$ and above a critical temperature $T_c$; and temperatures that are below $T_c$. Experimental methods and results utilizing the optimization system will be discussed in greater detail herein below.

Experimental Methods

A PLA material (100 wt. % polylactic acid, CAS no. 9051-89-2) was used for extrusion during the mechatronic deposition, as the material has a relatively low glass transition temperature (60° C.) [28], [29] and adheres to the double-Couette rheological model [30]. Preliminary tests indicated ABS (acrylonitrile butadiene styrene) and Nylon did not possess the most explicit thermographic contrast at the moment of contact. Before printing, the filament was housed in a desiccator-dehumidifier for 24 hours at a target temperature of 50° C. and 15% humidity. Custom g-code enabled consistent specimen deposition and placement on the test-bed apparatus at an extrusion temperature of 210° C. The experimental design consisted of three different surface treatments covering the spectrum of surface tension from high to low designated, respectively, as tape, bare, and greased. In addition, a modified print-bed was designed and utilized during this study, as discussed in the below measurement methodology. Table 1 describes the runs conducted on the modified-supportive substrate at the surface-level treatments.

TABLE 1

Materials used as extrudate and various substrates

Extrudate

| Composition | Melting Temperature | Density | Surface Tension |
|---|---|---|---|
| PLA Polylactic Acid (100 wt. %) $C_6H_8O_4$ | 155° C. | 1.27 g/cm$^3$ | 36-42 mN/m |

Surface Treatment

| Classification | Material (Manufacturer) | Composition | Surface Tension |
|---|---|---|---|
| Tape | Scotch-Blue ™ Painter's Tape 2090 (3M) | Polyacrylate Paper (50-55 wt. %) | >36 mN/m |
| Bare | Transparency Film (3M) | Cellulose Acetate (45-50 wt. %) $C_{164}H_{174}O_{111}$ | 36 mN/m |
| Greased | Poly-Ease ® (Polytek) | Dimethyl either (35-55 wt. %) $C_2H_6O$ 1,1-Difluoroethane (35-55 wt. %) $C_2H_4F_2$ | <36 mN/m |

The bare surface was a multipurpose transparency film (cellulose acetate, 100 wt. % coated polyester film), which was selected to act as the base layer and enabled more IR transmissions for in-situ characterization than conventional glass beds. In contrast, tape marked under the trade name 3M Scotch-Blue™ Painter's Tape 2090 was selected for this experiment, composed of a papyrus surface (45-50 wt. %) and polyacrylate (50-55 wt. %) acting as the adhesive underlayer. The material possessed more considerable surface tension and was selected to promote the successful adhesion of the extrudate. In contrast, the greased surface was selected to minimize surface tension and promote failure. For this level, a release agent marketed under the trade name Pol-Ease® 2300 was applied to the bare surface before each respective sample run. This substance was composed of Dimethyl ether (35-55 wt. %, CAS no. 115-10-6) acting as a reagent or solvent and 1,1-Difluoroethane (35-55 wt. %, CAS no, 75-37-6) acting as an aerosol.

A design of experiments was set up to explore the parameter space essential to the process of adhesion. The experimental design parameters were selected based on previous literature [34]-[36] to invoke a varied adhesion response of extrudate to the printing surface. The full factorial design consisted of three factors between three levels. Variations in inter-nozzle fluid properties were mitigated through consistent printing temperatures, utilizing the same 1 mm diameter nozzle and a purge and wipe maneuver before each run. Table 2 describes the operating parameters of the experimental setup to which there were three replicates each and a total of 81 experimental runs. The printing speed, factor 1, varied from 15 mm/s to a maximum speed of 100 m/s (designated by feed rate in the machine code). Factor 2 was denoted for the later height and consisted of a stand-off region based on a percentage of the inner nozzle diameter. The surface treatment was analogous to surface roughness and was treated as a critical factor of interest. The modified contact theory indicates that the surface conditions were approximated based on the slip and non-slip regions.

TABLE 2

Printing parameters

| Input Factor | Min | Mid | Max |
|---|---|---|---|
| Printing Speed (mm/s) | 15 | 40 | 100 |
| Layer Height (mm) | 0.5 d | 1.0 d | 1.5 d |
| Surface Tension (mN/m) | >36 | 36 | <36 |

RA-AM was uniquely positioned to use process informatics for real-time control. The final experimental action was to run all data sets through a Convolutional Neural Network (CNN), classifying pass, slide, and failing of the sample. Specifically, the data set consisted of four distinct groups (M1-M4, as shown in FIG. 3) and derived from the optical (M1) and a thermal camera (M2-4). The difference in collection rate and resolution of the hardware resulted in a total of 942 optical images and 3251 thermal images, of which 70% would be used for training the optimization model, 20% for validation, and 10% for testing. Testing and validation were set to 20 epochs total in batch sizes of 16 and 32, respectively, with scaling set to 224×224×3px.

Figure 9:
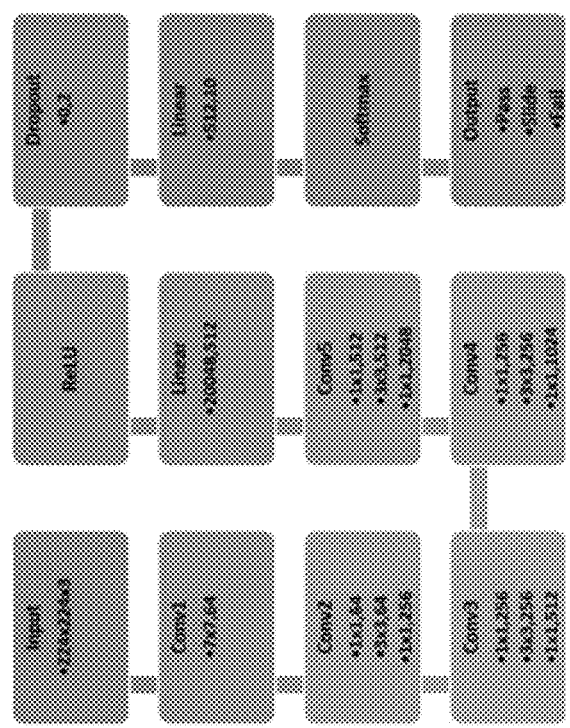
FIG. 9 depicts an overview of a model architecture of the system of FIG. 1, in accordance with an embodiment of the present invention.

The architecture of the model was a resnet50 modified with five additional layers depicted in FIG. 9. The Adam algorithm [37] was utilized as the optimizer to train the network, and the learning criterion was CrossEntropyLoss, with an initial rate of 0.003. Implementation was performed remotely via hardware marketed under the trade name PyTorch utilizing HiPerGator 3.0 [38]; precisely, a GPU cluster partition utilizing 16 CPU cores, 48 GB of RAM, and a GPU marketed under the trade name NVIDIA A100 80 GB Tensor Core.

Experimental Results

Figure 5:
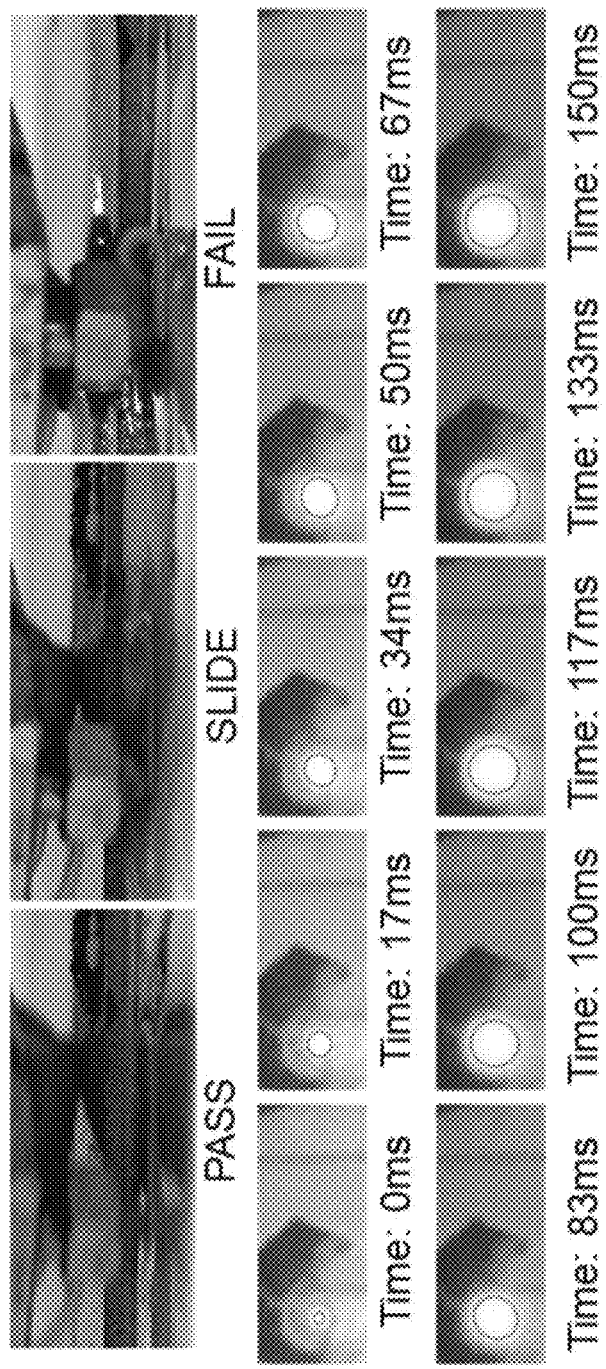
FIG. 5 depicts time-lapsed images of an extrudate of a 1.0 mm hot end monitoring area growth and morphology indicating pass, slide, and fail of the filament.

PLA deposition follows the Carreau-Yasuda model [39] and is presented in FIG. 5. The process of extrusion, starting with the iris formation. The time-lapse $t_{41}$-$t_{410}$ shows the sequence of processing the thermoplastic, at which point the feeding filament's initial processing conditions created an exerting force in which to extrude material past its yield point. These are the unrefined thermal images in greyscale measured by the posterior angle of the IR camera. Under thermomechanical loading, the polymer-melt begins to exit the nozzle, and the deformation was initially captured at time step $t_{47}$. The time evolution of the extrusion process was measured under a span of 150 ms. Initially, at $t_{41}$, the initial iris formation of the extruding material could be seen. The $t_{41}$-$t_{46}$ shows the transitioning increase in the area of the molten material, indicating the formation of the extrudate prior to deposition. The area growth occurred over approximately 100 ms, given that the inner diameter of the print head is 1.0 mm (e.g., inner orifice). The transitioning state of pluming occurred between $t_{A7}$-$t_{A9}$, where the extrudate contacts the substrate and growth larger than the orifice before translating. After deposition, the quality of the extrudate and the position of the translating head were observed via optical imaging along the sagittal plane. FIG. 5 shows three distinct surface interactions, which for this study were classified as pass, slide, and fail. The pass condition provided the optimal surface conditions for full adhesion and tack-down given the printing parameters.

Figure 6:
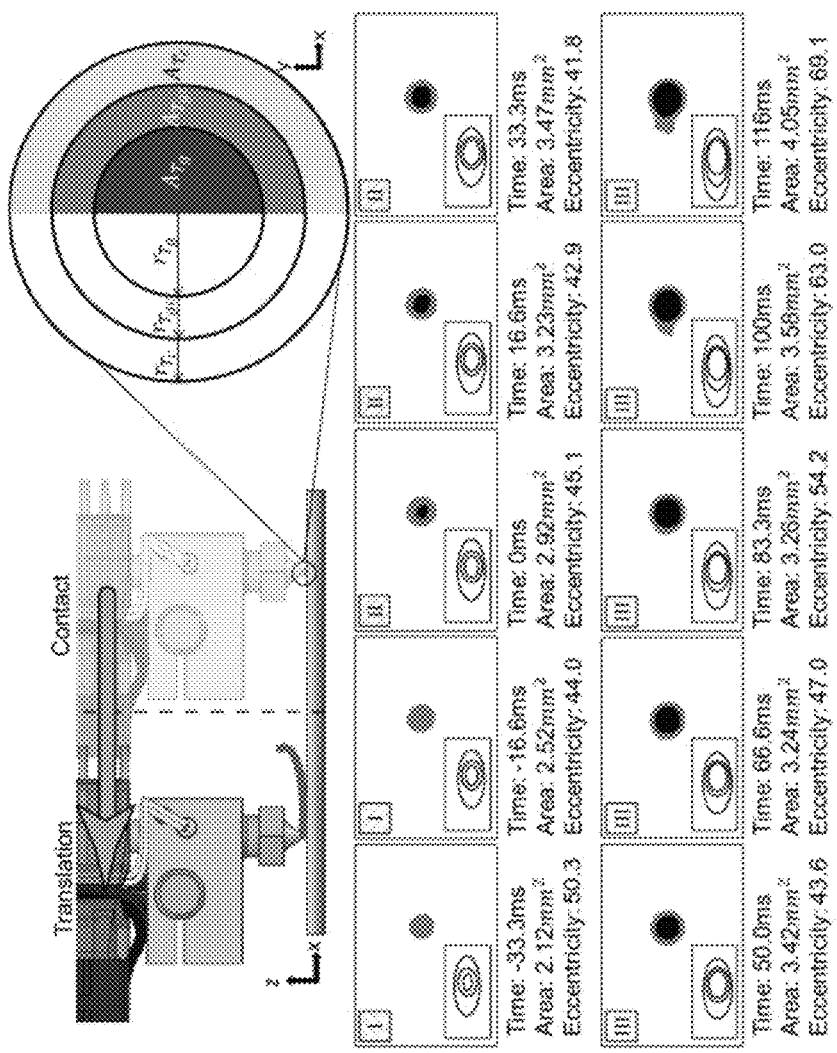
FIG. 6 depicts an embodiment of a hot end transition from a contact phase to translation for a filament, showing extrudate regions of interest in the posterior plane of the substrate, and depicting time-lapsed images of adhesion success or failure based on area growth and morphology.

In the context of MatEx, visual inspection during the translation process is the standard practice for categorizing the adhesion quality of prints after a failure occurs, which assesses if the structure is compromised. The time frame in which the following study begins is when the extrudate contacts the substrate and when the hot end initiates translation. This experimental setup facilitates the instantaneous qualification of extrudate adhesion leading up to translation, such as the contact position to the translation of the RA-AM head as shown in FIG. 6.

In the process of polymer extrusion, the extrudate exiting the nozzle undergoes partial crystallization and solidification before reaching the substrate: the intricacies of which are flow and feedstock dependent [12]. Since the act of adhesion during pluming occurs under a 34 ms interval, the following analysis prioritizes the extrusion event within three regions in the posterior plane. The glass transition temperature ($T_g$) and a tunable critical temperature ($T_c$) were obtained from the thermography measurement. In effect, this reduced the noise in measuring the iris formation. The characteristic length parameter was considered to represent the ratio of solidified regions at the contact interface during the adhesion process. The characteristic length for adhesion, $L_c$, is calculated according to Eq. 5:

$$L_c = \frac{r_{T_{gc}} + r_{T_c}}{\sum r} \quad (5)$$

where $r_{T_{gc}}$ is the area of extrudate between $T_g$ and $T_c$. The area of extrudate under $T_c$ and the ambient temperature is denoted $r_{T_c}$. The characteristic length, $L_c$, defines the percent of the extrudate acting against the substrate surface prior to a forward translation, as demonstrated in FIG. 5. FIG. 6 also provides a schematic of the thermal transitions and specific sites for adhesion. For pristine surface conditions and optimal operating conditions, the $L_c$ should approach 0, enabling the highest degree of molten material to assist in adhesion.

Individual frames captured during the deposition process are segmented into three distinct phases: I) iris formation; II) pluming at contact; and III) translation. During the trial, the area growth measured as $r_{T_g}$ underwent a consistent increase during successful deposition. Eccentricity, a measure of the deposition's uniformity, decreased from phase I to II and increased rapidly at the start of II. The eccentric profile is provided in the contoured insert shown in FIG. 6.

Figure 7:
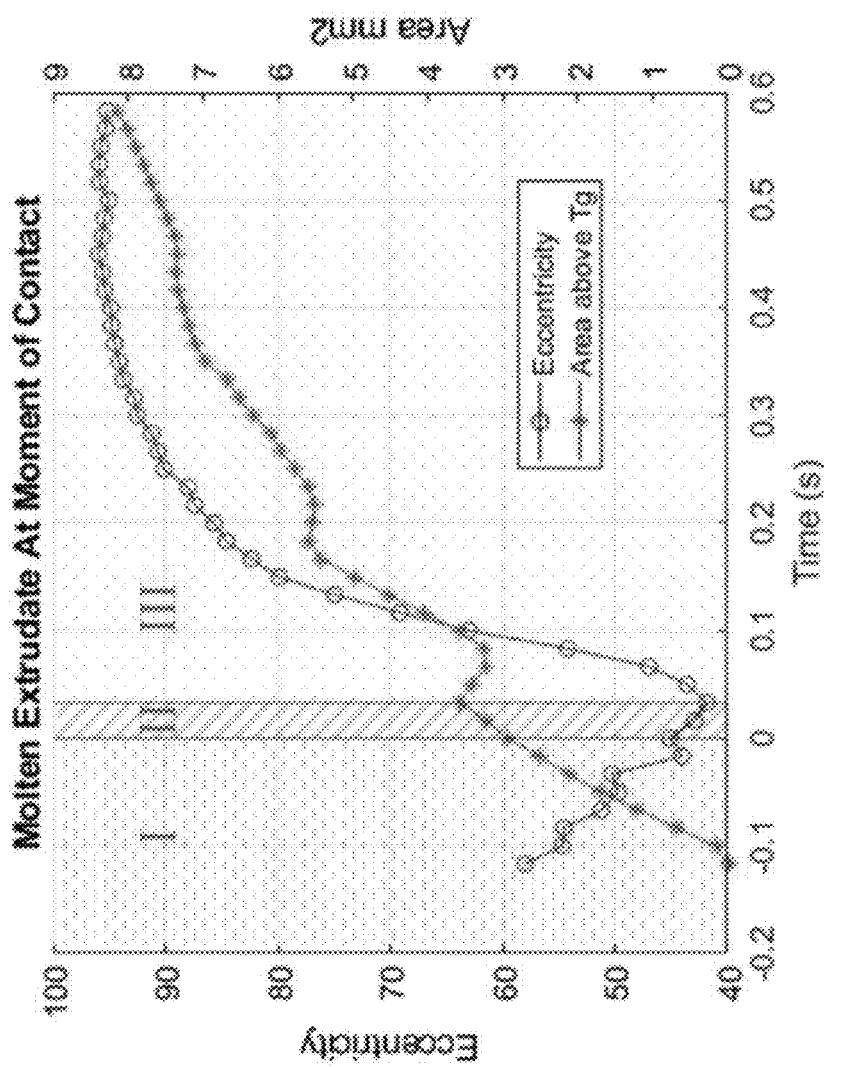
FIG. 7 graphically depicts eccentricity and area of a deposited filament as a function of time at the moment of contact, in accordance with and embodiment of the present invention.

Moreover, referring to FIG. 7, a compilation chart of the eccentric of a sample emblematic to all successful runs is shown, including the three phases described above across a time horizon. Analysis of eccentricity and $A_{T_g}$ binning of the same successful trail in FIG. 6 is shown graphed across time, and measurements were taken within the experiment. Prior to translation, area growth increased consistently as internal nozzle pressure builds, and initial extrudate exited the channel. Concurrently, the eccentricity decreased towards a global minimum as the extrudate contacted the substrate and reached a droplet-shaped equilibrium. Before the transition from phase II to phase III, the extrudate morphology took on the properties of the nozzle diameter, nearly matching the exit area and circularity of the 1 mm channel. The quick expansion of the initial deposit during contact is marked in the shaded region after the '0' mark. Across all trials, this pluming phase consistently spanned 33.3 ins and concluded with similar eccentric and binning metrics, regardless of the outcome, and therefore marks the boundary between two physical regimes of interest. Entering the translation phase of extrusion after marked 33.3 ms, eccentricity climbed rapidly, signifying that the extrudate had successfully adhered to the substrate and caused the object measured in the frame to elongate. Concurrently, binning shows $A_{T_g}$ to slightly decrease for a 33.3 ms span as the initial deposit began to cool, and the new material had yet to make contact with the bed. This area increased for the remainder of the trial and plateaued with eccentricity as the hot end exited the frame, and what deposit remained cooled towards solidification. The molten area and eccentricity follow a piecewise least-squares fit with an $R_2$ of 99% in equation 6:

$$A_{t_g}(t) = \begin{Bmatrix} 25.17x + 2.857 & , t \leq 0.033 \\ -1.331x^7 + 3.097x^6 - 2.887x^5 + 1.406^4)e5 - 3.783e4x^3 + 5492x^2 - 371.4x + 12.25 & , t > 0.033 \end{Bmatrix} \quad (6)$$

$$e(t) = \begin{Bmatrix} -107.7x + 44.75 & , t \leq 0.033 \\ -2975x^4 + 4846x^3 - 2961x^2 + 819.4x + 6.657 & , t > 0.033 \end{Bmatrix} \quad (6)$$

Figure 8:
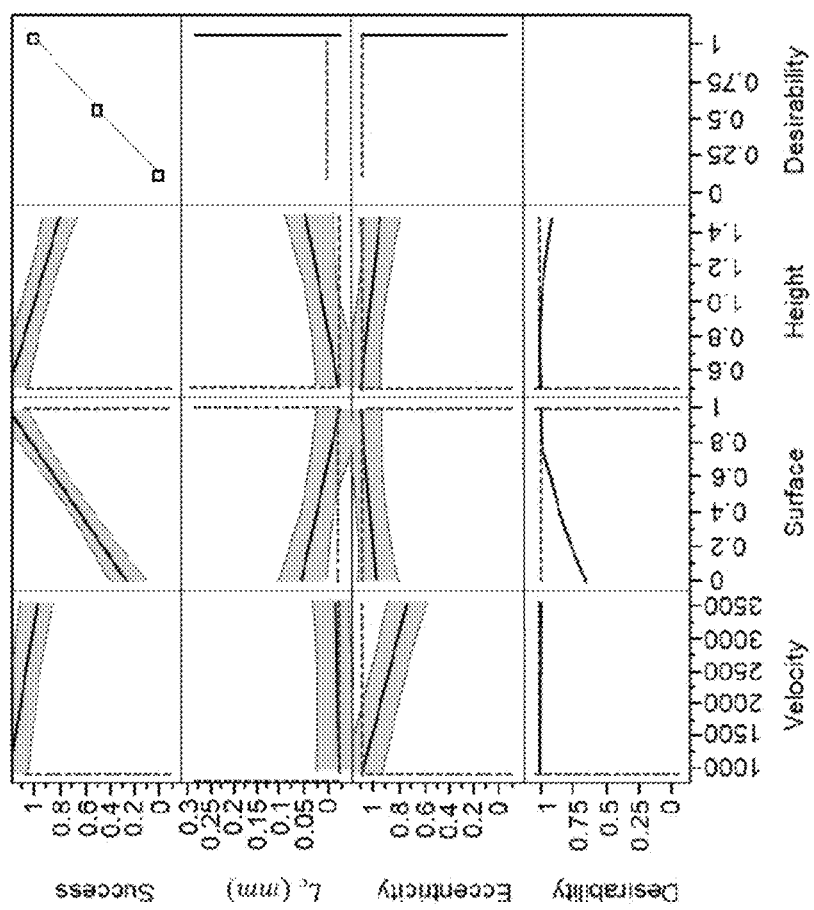
FIG. 8 graphically depicts optimizations of filament deposition as determined using the system of FIG. 1, in accordance with an embodiment of the present invention.

To assess the significance of the process parameters and their interaction effects, an analysis of variance (ANOVA) was performed where model terms of larger F value (Fisher F test) and a low probability value (P<0.0100) have a significant effect on the dynamics of adhesion before translation. According to the results shown in Table 3, experimental factors of surface conditions, nozzle height, translation velocity, and the interaction between surface and height were significant. The successful adhesion response found the highest adjusted $R^2$ value at 66.88%, followed by eccentricity and $L_c$. Furthermore, the surface condition and height were the only significant effects regarding the $L_c$ response, likely due to translation velocity not yet introduced at the time of measurement. FIG. 8 graphically describes experimental factors to maximize the outcome of successful adhesions amongst trials, represented as the "desirability" factor. The resulting optimization suggests that translating velocity should be minimized, surface energy should be maximized, and nozzle height from the substrate should be low to ensure successful adhesion. Additionally, the steep slope across surface energy shows that it contributes most to determining a successful adhesion, followed by the nozzle height, as shown in FIG. 8. Furthermore, the model shows that higher eccentricity aid lower $L_c$ are emblematic of a successful trial and are most susceptible to translating velocity and surface conditions, respectively.

TABLE 3

Analysis of variance towards successful adhesion, $L_c$, and eccentricity

| Source | DOF | Sum of Squares | F Ratio | Prob > F | Remarks |
|---|---|---|---|---|---|
| (a) Success | | | | | |
| Velocity | 1 | 0.584497 | 11.3406 | 0.0012 | Significant |
| Surface | 1 | 7.041666 | 136.6251 | <0.0001 | Significant |
| Height | 1 | 0.462963 | 8.8926 | 0.0037 | Significant |
| Surface*Height | 1 | 0.444444 | 8.6233 | 0.0044 | Significant |
| Error | 76 | 3.917 | | | |
| Cor Total | 80 | 12.4506 | | | |
| (b) $L_c$ | | | | | |
| Velocity | 1 | 0.000393 | 0.0561 | 0.8135 | Not Significant |
| Surface | 1 | 0.114817 | 16.3925 | <0.0001 | Significant |
| Height | 1 | 0.088817 | 12.6804 | 0.0006 | Significant |
| Surface*Height | 1 | 0.444444 | 8.6233 | 0.0044 | Not Significant |
| Error | 76 | 0.532321 | | | |
| Cor Total | 80 | 0.737691 | | | |
| (c) Eccentricity | | | | | |
| Velocity | 1 | 1.946611 | 28.7201 | <0.0001 | Significant |
| Surface | 1 | 2.428835 | 35.8348 | <0.0001 | Significant |
| Height | 1 | 2.678854 | 39.5236 | <0.0001 | Significant |
| Surface*Height | 1 | 0.716037 | 0.71604 | <0.0017 | Significant |
| Error | 76 | 5.151173 | | | |
| Cor Total | 80 | 12.92150 | | | |

(a) $R^2$ = 68.53%, Adjusted $R^2$ = 66.88%, RMSE = 22.70%
(b) $R^2$ = 27.84%, Adjusted $R^2$ = 24.04%
(c) $R^2$ = 60.14%, Adjusted $R^2$ = 58.04%, RMSE = 26.03%

Figure 10A:
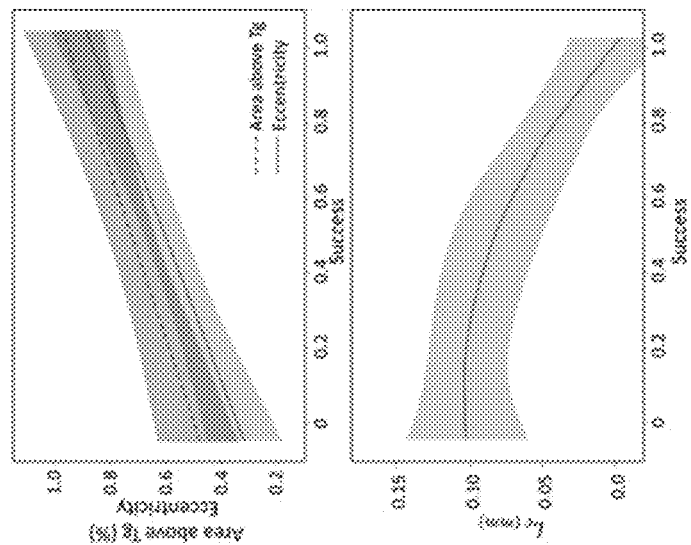
FIG. 10A graphically depicts successful adhesion based on eccentricity and a characteristic length for adhesion, $L_c$, of the filament, in accordance with an embodiment of the present invention.
Figure 10B:
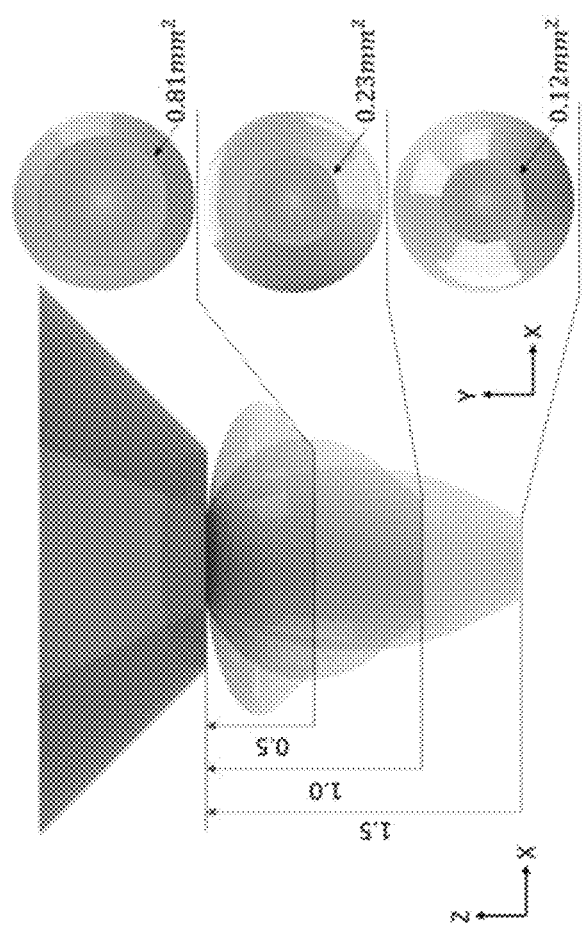
FIG. 10B depicts area growth and morphology for a filament based on the system of FIG. 1, in accordance with an embodiment of the present invention.
Figure 10C:
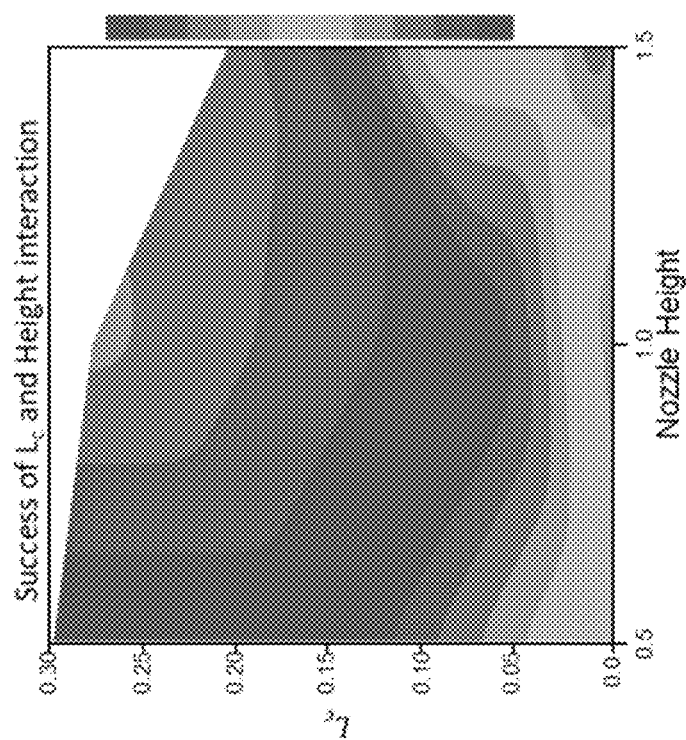
FIG. 10C graphically depicts a heatmap of successful adhesion based on a nozzle height and a characteristic length for adhesion, $L_c$, of the filament, in accordance with an embodiment of the present invention.

To better assess the statistical significance of the experimental procedure, a design of the experiment model was utilized. The analysis explored the quantitative and qualitative assessments concerning the parameters outlined in the methodology section. In this section, a comparison of $L_c$ across all trials with adhesion shows lengths approaching 0.0 correspond largely to full adhesion with the substrate. The linear fit, shown in FIG. 10A, was performed with an $R^2$ value of 0.65 and showed trials should pursue lengths less than 0.05 mm to maximize success. The higher eccentricity and the larger area above glass transition at the conclusion of II were indicators of trials with a greater probability of success. Furthermore, the extruding nozzle's proximity to the substrate directly influences the initial contact area of the extrudate ranging from 0.12 mm to 0.81 mm in FIG. 10B. Therefore, the corresponding heatmap in FIG. 10C contextualizes height's influence regarding Lc. Demonstrating that larger nozzle heights are susceptible to higher failure rates due to the larger distance traveled towards the surface with a smaller area susceptible to early cooling. Lower nozzle distances promoted greater contact areas and tolerated a larger Lc in successful trials and offered an alternative means to compensate for less than desirable surface conditions.

To classify tack down operations under the RA-AM system, machine learning was employed to 1) validate the design of experiment results, 2) corroborate the in-situ classification of successful adhesion and 3) evaluate the efficacy of economically accessible techniques (i.e., M1). Since the collected data could be represented visually, a convolutional neural network (CNN) was deployed with frames from depositional phases II to III to classify prints under the pass, slide, or fail conditions.

Figure 11:
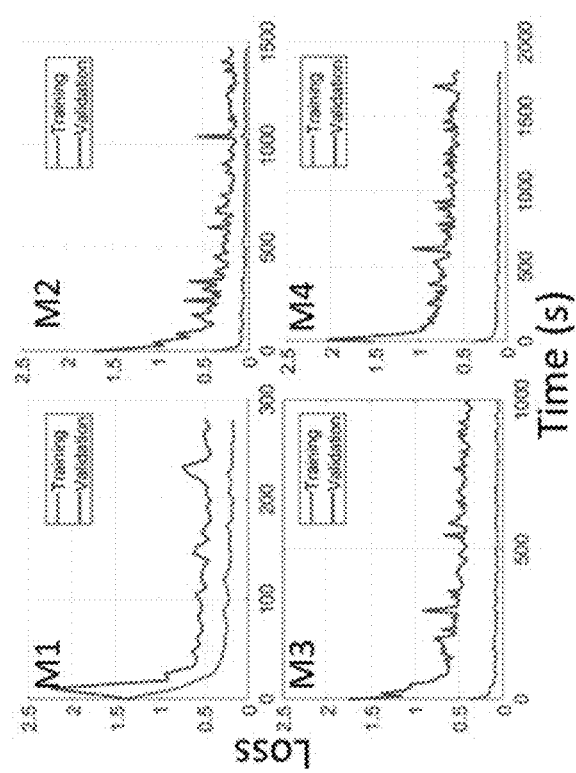
FIG. 11 graphically depicts training and validation loss based on the system of FIG. 1, showing loss derived from: a digital microscope (in section M1); an infrared capture device (in section M2); spatial-temporal binning (in section M3); and eccentricity of temperature bands (in section M4); in accordance with an embodiment of the present invention.

The performance of the optimization model is graphically shown in FIG. 11, in which training and validation loss of each method are reported in reference to time. Overall, the quick plateau amongst training loss indicates the model was overtraining and, therefore, not benefiting most of this time. However, the gradual decrease in validation loss indicates improved prediction accuracy in the model, showing no signs of overfitting. Regarding disk space, M2 was the largest, whereas individual images averaged 34%, 4%, and 27% (M1, M3, M4) of M2; it was initially presumed this would be reflected in the processing times of the model. However, model run-time was lowest in M1 due to the lower sample count and highest for M4, which alludes to a higher significance in how the images were processed over their size. Overall, the validation accuracy of the model was calculated to be 76.04%, 93.30%, 77.47%, and 78.37% for M1-M4, respectively, with the raw thermal images of M2 performing the best. Whereas the remaining methods performed very similar to one another, notably, the additional ~800 seconds training M4 did not significantly improve performance, and in contrast, the lower collection rate and resolution of M1 did not net a significant decrease.

Figure 12:
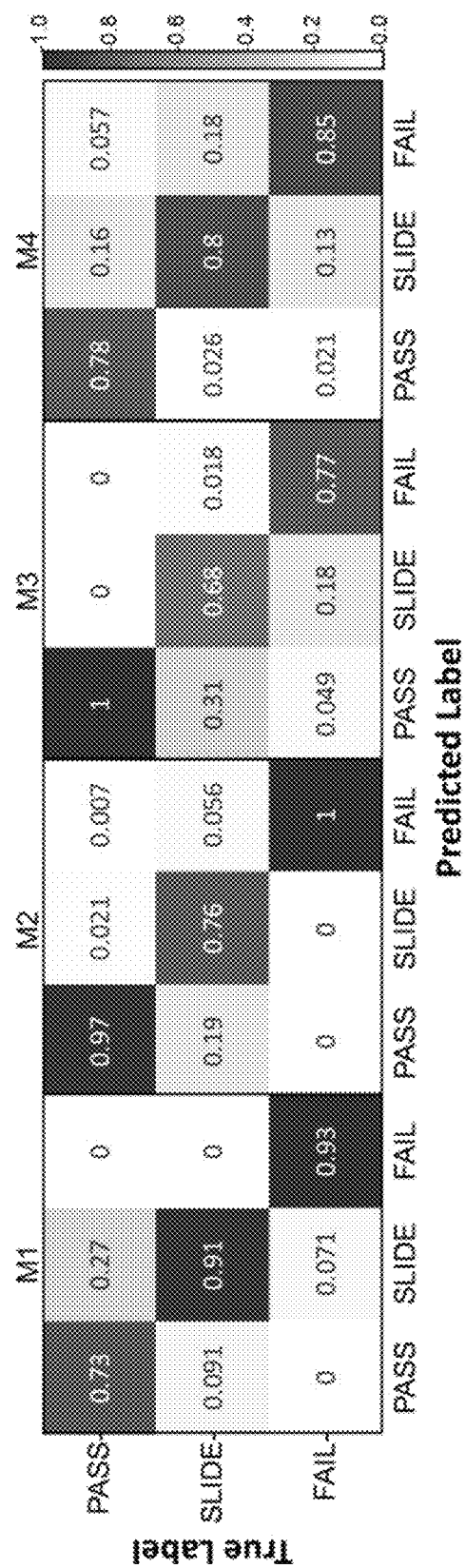
FIG. 12 depicts confusion matrices developed from the testing dataset for the system of FIG. 1, showing a predicted pass, slide, and fail rate for each model, in accordance with an embodiment of the present invention.

In addition, as shown in FIG. 12, confusion matrices were developed from the testing dataset, reporting the percentage of adhesion classified correctly by each method. In the event the learning algorithm matches the performance of a human operator, a diagonal value of 1, representing 100% accuracy, is expected. Otherwise, a lower diagonal value indicates the magnitude to which the learning algorithm has been "confused" in its classification attempt. In this regard, all methods performed well and presented a strong diagonal value indicative of an accurate classification in likeness to an operator. However, the degree of accuracy and site of confusion appear unique to each method.

The majority of confusion in M1 resulted from mistaking successful adhesion as sliding. Fundamentally, the initial phase of pluming (stage II) is identical, as the iris makes contact with the surface. This is represented to the optical camera as the nozzle appearing in the same location with a similar amount of filament being deposited each time. Additionally, the sagittal position of the camera can only highlight a single layer's height as the primary feature to judge adhesion, with resolution and decreased capture speed limiting it more so.

Conversely, M2's performance matches what was expected. Since sliding retains attributes of both successful and failed adhesion, it was expected that confusion would be heightened here. This method performed the best with regard to pass and fail (a binary classification). Since the framerate and resolution of the thermal camera is much higher than the optical, and the field of view is more pronounced, this performance aligns with those benefits. Since stage II begins with contact that appears to be successfully adhered before failing, the confusion between labeling these frames is understandable, and expected to improve given more training data.

M3 and M4 suffered more confusion than the other methods, likely due to the image generation relying on a user-defined value for critical temperature A significant trend was shown in successful adhesion with extrudate of higher temperature at the point of contact with the substrate. Features that would be influenced by this would be the absence of darkened areas in M3 and the loss of an internal iris in M4; making distinguishing a pass classification significantly easier than separating a slide from a fail. This is likely the reason why M3 never misclassified a pass.

CONCLUSION

The RA-AM approach for next-generation additive operations heavily depends on the successful initial adhesion of deposited materials. The ability to rapidly deposit thermoplastic matrix materials was tested across differing surface energy conditions and nozzle heights, given PLA's adherence. A standard 1 mm nozzle diameter was utilized to study the translational process dynamics, and the initial tack down is observed and characterized. Material properties of interest, particularly $T_g$, was significant in this process as it determines the rate at which the polymer matrix, PLA, melts and solidifies. Experimental results quantified properties responsible for adhesion, granting inline control to mitigate failure in the printing process. Specifically, successful tackdown was found to tolerate a sufficient solidified section of material, $L_c$<0.05 mm, coupled with the larger interface area, provided the nozzle's increased proximity to the surface. The posterior thermography garnered insight into the adhesion mechanism's morphological effects, as eccentricity approaching 0.85 and molten area growth up to 100% are relevant identifiers of success. An in-situ control was explored through machine learning classification of adhesion, showing M4 as the preferred data representation scheme with the highest validation accuracy of 85%.

REFERENCES

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

[1] P. M. Martin, Ed., "Chapter 1—Deposition Technologies: An Overview," in Handbook of Deposition Technologies for Films and Coatings (Third Edition), Boston: William Andrew Publishing, 2010, pp. 1-31. doi: 10.1016/B978-0-8155-2031-3.00001-6.

[2] Z. Cal, B. Liu, X. Zou, and H.-M, Cheng, "Chemical Vapor Deposition Growth and Applications of Two-Dimensional Materials and Their Heterostructures," Chem. Rev., vol. 118, no. 13, pp. 6091-6133, July 2018, doi: 10.1021/acs.chemrev.7b00536.

[3] L. Jeffus, Welding: Principles and Applications. Cengage Learning, 2020.

[4] A. C. Abbott, G. P. Tandon, R. L. Bradford, H. Koerner, and J. W. Baur, "Process-structure-property effects on ABS bond strength in fused filament fabrication," Addit. Manuf., vol, 19, pp. 29-38, January 2018, doi: 10.1016/j.addma.2017.11.002.

[5] G, D. Goh, Y. L. Yap, H. K. J. Tan, S. L. Sing, G. L. Goh, and W. Y. Yeong, "Process-Structure-Properties in Polymer Additive Manufacturing via Material Extrusion: A Review," Crit. Rev. Solid State Mater. Sci., vol. 45, no. 2, pp. 113-133, March 2020, doi: 10.1080/10408436.2018.1549977.

[6] D. V. Rosato and M. G. Rosato, Injection Molding Handbook. Springer Science & Business Media, 2012.

[7] J. Frketic, T. Dickens, and S. Ramakrishnan, "Automated manufacturing and processing of fiber-reinforced polymer (FRP) composites: An additive review of contemporary and modern techniques for advanced materials manufacturing," Addit. Manuf., Vol. 14, pp. 69-86, March 2017, doi: 10.1016/j.addma.2017.01.003.

[8] B. Redwood, F. Schöffer, and B. Garret, The 3D Printing Handbook: Technologies, design and applications, 1st edition. Amsterdam: 3D Hubs, 2017.

[9] J. Go, S. N. Schiffres, A. G. Stevens, and A. J. Hart, "Rate limits of additive manufacturing by fused filament fabrication and guidelines for high-throughput system design," Addit. Manuf., vol. 16, pp. 1-11, August 2017, doi: 10.1016/j.addma.2017.03.007.

[10] V. Srinivas, C. S J. van Hooy-Corstjens, S. Rastogi, and J. A. W. Harings, "Promotion of molecular diffusion and/or crystallization in fused deposition modeled poly (lactide) welds," Polymer, vol. 202, p. 122637, August 2020, doi: 10.1016/j.polymer.2020.122637.

[11] H. Prajapati, D. Ravoori, R. L. Woods, and A. Jain, "Measurement of anisotropic thermal conductivity and inter-layer thermal contact resistance in polymer fused deposition modeling (FDM)," Addit. Manuf., vol. 21, pp. 84-90, May 2018, doi: 10.1016/j.addma.2018.02.019.

[12] C. McIlroy, "A fundamental rule: Determining the importance of flow prior to polymer crystallization," Phys. Fluids, vol. 31, no. 11, p. 113103, November 2019, doi: 10.1063/1.5129119.

[13] 1. Xia, J. Lu, and G. Tryggvason, "A numerical study of the effect of viscoelastic stresses in fused filament fabrication," Comput. Methods Appl. Mech. Eng., vol. 346, pp. 242-259, April 2019, doi: 10.1016/j.cma.2018.11.031.

[14] G. D. Kim and Y. T. Oh, "A benchmark study on rapid prototyping processes and machines: Quantitative comparisons of mechanical properties, accuracy, roughness, speed, and material cost," Proc. Inst. Mech. Eng. Part B J. Eng. Manuf., vol. 222, no. 2, pp. 201-215, February 2008, doi: 10.1243/09544054JEM724.

[15] J. R. Tumbleston et al., "Continuous liquid interface production of 3D objects," Science, vol. 347, no. 6228, pp 1349-1352, March 2015, doi: 10.1126/science.aaa2397.

[16] C. McIlroy and P. Olmsted, "Disentanglement Effects on the Welding Behaviour of Polymer Melts during the Fused-Filament-Fabrication Method for Additive Manufacturing," ArXiv170309295 Cond-Mat, March 2017, Accessed: Jan. 14, 2019. [Online]. Available: http://arxiv.org/abs/1703.09295

[17] D. P. Cole, J. C. Riddick, H. M. Iftekhar Jaim, K. E. Strawhecker, and N. E. Zander, "Interfacial mechanical behavior of 3D printed ABS," J. Appl. Polym. Sci., vol. 133, no. 30, August 2016, doi: 10.1002/app.43671.

[18] H. Xia, J. Lu, S. Dabiri, and G. Tryggvason, "Fully Resolved Numerical Simulations of Fused Deposition Modeling. Part I-Fluid Flow," ArXiv171105940 Phys., November 2017, Accessed: Aug. 1, 2018. [Online]. Available: http://arxiv.org/abs/I711.05940

[19] C. McIlroy and R. S. Graham, "Modelling flow-enhanced crystallisation during fused filament fabrication of semi-crystalline polymer melts," Addit. Manuf., vol. 24, pp. 323-340, December 2018, doi: 10.1016/j.addma.2018.10.018.

[20] L F. M. da Silva, A. Öchsner, and R. 1). Adams, Eds., Handbook of Adhesion Technology. Berlin, Heidelberg: Springer Berlin Heidelberg, 2011. doi: 10.1007/978-3-642-01169-6.

[21] G. R. Berger, C. Steffel, and W. Friesenbichler, "On the use of interfacial tension parameter to predict reduction of friction by mold coatings in injection molding of polyamide 6," Graz, Austria, 2016, p. 020006. doi: 10.1063/1.4965457.

[22] Q. Zhao, Y. Liu, and E. W. Abel, "Effect of temperature on the surface free energy of amorphous carbon films," J. Colloid Interface Sci., vol. 280, no. 1, pp. 174-183, December 2004, doi: 10.1016/j.jcis.2004.07.004.

[23] T. J. Coogan and D. O. Kazmer, "Modeling of interlayer contact and contact pressure during fused filament fabrication," J. Rheol., vol. 63, no. 4, pp. 655-672, June 2019, doi: 10,1122/1.509.3033.

[24] M. Spoerk et al., "Optimisation of the Adhesion of Polypropylene-Based Materials during Extrusion-Based Additive Manufacturing," Polymers, vol. 10, no. 5, Art. no. 5, May 2018, doi: 10.3390/polym10050490.

[25] G. R. Berger, C. Steffel, and W. Friesenbichler, "A study on the role of wetting parameters on friction in injection moulding," Int. J. Mater. Prod. Technol., vol. 52, no. 1/2, p. 193, 2016, doi: 10.1504/IJMPT.2016.073632.

[26] C. A. Fuentes et al., "Predicting the adhesion strength of thermoplastic/glass interfaces from wetting measurements," Colloids Surf. Physicochem. Eng. Asp., vol. 558, pp. 280-290, December 2018, doi: 10.1016/j.colsurfa.2018.08.052.

[27] W. I. Lee and G. S. Springer, "A Model of the Manufacturing Process of Thermoplastic Matrix Composites," J. Compos. Mater, vol. 21, no. 11, pp. 1017-1055, November 1987, doi: 10.1177/002199838702101103.

[28] M. A. Cuiffo, J. Snyder, A. M. Elliott, N. Romero, S. Kannan, and C. P. Halada, "Impact of the Fused Deposition (FDM) Printing Process on Polylactic Acid (PLA) Chemistry and Structure," Appl. Sci., vol. 7, no. 6, p. 579, June 2017, doi: 10.3390/app7060579.

[29] X. Zhou, S.-J. Hsieh, and Y. Sun, "Experimental and numerical investigation of the thermal behaviour of polylactic acid during the fused deposition process," Virtual Phys. Prototyp., vol. 12, no. 3, pp. 221-233, July 2017, doi: 10.1080/17452759.2017.1317214.

[30] P. E. Le Marec, J.-C. Quantin, L. Ferry, J.-C. Bénëzet, S. Guilbert, and A. Bergeret, "Modelling of PLA melt rheology and batch mixing energy balance," Eur. Polym. J., vol. 60, pp. 273-285, November 2014, doi. 10.1016/j.eurpolymj.2014.09.012.

[31] K. Pooladvand and C. Furlong, "Computational and Experimental Characterization of 3D Printed Components by Fused Deposition Modeling," in Mechanics of Additive and Advanced Manufacturing, Volume 8, S. Kramer, J. L. Jordan, 1H. Jin, J. Carroll, and A. M. Beese, Eds. Cham: Springer International Publishing, 2019, pp. 87-95. doi: 10.1007/978-3-319-95083-9_16.

[32] J. E. Seppala and K. D. Migler, "Infrared thermography of welding zones produced by polymer extrusion additive manufacturing," Addit. Manuf., vol. 12, pp. 71-76, October 2016, doi: 10.1016/j.addma.2016.06.007.

[33] E. Ferraris, J. Zhang, and B. Van Hooreweder, "Thermography based in-process monitoring of Fused Filament Fabrication of polymeric parts," CIRP Ann., vol. 68, no. 1, pp. 213-216, 2019, doi: 10.1016/j.cirp.2019.04.123.

[34] J. B. Frketic, S. Psulkowski, A. Sharp, and T. Dickens, "Dexterous Printing and Fabrication of Multi-Functional Parts: Design for Science and Engineering Education," Procedia Manuf., vol. 10, pp. 1087-1096, January 2017, doi: 10.1016/j.promfg.2017.07.099.

[35] A. Dey and N. Yodo, "A Systematic Survey of FDM Process Parameter Optimization and Their Influence on Part Characteristics," J. Manuf. Mater. Process., vol. 3, no. 3, p. 64, July 2019, doi: 10.3390/jmmp3030064.

[36] O. Luzanin, D. Movrin, V. Stathopoulos, P. Pandis, T. Radusin, and V. GCuduric, "Impact of processing parameters on tensile strength, in-process crystallinity and mesostructure in FDM-fabricated PLA specimens," Rapid Prototyp. J., vol. 25, no. 8, pp. 1398-1410, September 2019, doi: 10.108/RPJ-12-2018-0316.

[37] 1). P. Kingma and J. Ba, "Adam: A Method for Stochastic Optimization," ArXiv14126980 Cs, January 2017, Accessed: Jan. 25, 2022. [Online]. Available: http://arxiv.org/abs/1412.6980

[38] "HiPerGator—Research Computing—University of Florida." https://www.rc.ufl.edu/about/hipergator/ (accessed Jan. 25, 2022).

[39] Y. Zare, S. P. Park, and K. Y. Rhee, "Analysis of complex viscosity and shear thinning behavior in poly (lactic acid)/poly (ethylene oxide)/carbon nanotubes biosensor based on Carreau-Yasuda model," Results Phys., vol. 13, p. 102245, June 2019, doi: 10.1016/j.rinp.2019.102245.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An optimization system for real-time control of adhesion dynamics during filament deposition, droplet formation, or both of an additive manufacturing process, the optimization system comprising:

a nozzle in communication with an additive manufacturing device including an amount of filament, the nozzle configured to receive the amount of filament from the additive manufacturing device for extrusion therefrom;

a print bed disposed beneath the nozzle, the print bed including a section of a thermally transparent thin film, such that the nozzle is aligned perpendicular to the section of the thermally transparent thin film of the print bed;

an optical capture device disposed above at least a portion of the print bed, below at least a portion of the nozzle, or both, the optical capture device being oriented orthogonally to the thermally transparent thin film;

a thermal capture device disposed beneath the print bed, the thermal capture device oriented within a sagittal plane of the print bed, such that the thermal capture device is aligned perpendicular to the section of the thermally transparent thin film of the print bed;

a processor communicatively coupled to the optical capture device and the thermal capture device;

wherein subsequent to receiving an electrical signal from the optical capture device, the processor is configured to activate a convolutional neural network comprising a plurality of characterization scheme datasets, the convolutional neural network being configured to identify, in real-time, a predetermined pass/fail criteria of thermoplastic adhesion along an interface between the print bed and the nozzle;

wherein the processor is configured to transmit an electrical signal to the optical capture device, whereby the optical capture device is configured to capture image-based feedback of the extrusion of the amount of filament from the nozzle to the print bed;

wherein, subsequent to the optical capture device capturing image-based feedback, the processor is configured to transmit an electrical signal to the thermal capture device, whereby the thermal capture device is configured to capture thermodynamic feedback of the extrusion of the amount of filament from the nozzle to the print bed; and wherein based on a comparison of the captured image-based feedback and the captured thermodynamic feedback and the identified predetermined pass/fail criteria, the processor, via the convolution neural network, is configured to determine, in real-time, adhesion dynamics during deposition of the filament, whereby subsequent to determining suboptimal adhesion dynamics based on the real-time comparison to the pass/fail criteria, the processor is configured to thermocouple calibrate the thermal capture device, in real-time, thereby offsetting emissivity fluctuations of the thermal capture device from the thin film, the nozzle, or both, and wherein the processor is configured to calculate a characteristic length of adhesion and adjust the distance between the nozzle and the print bed based on the calculated characteristic length of adhesion.

2. The optimization system of claim 1, wherein the section of the thermally transparent thin film of the print bed measures approximately 0.5 m$^2$ in area.

3. The optimization system of claim 1, wherein the thermally transparent thin film of the print bed is made of a cellulose acetate 100 wt. % coated polyester film.

4. The optimization system of claim 1, wherein the filament is made of a 100 wt. % polylactic acid.

5. The optimization system of claim 1, wherein the optical capture device is a digital microscope.

6. The optimization system of claim 5, wherein the digital microscope includes a capture rate of thirty frames per second with an associated resolution of 5 megapixels for each frame.

7. The optimization system of claim 1, wherein the thermal capture device is a forward-looking infrared camera.

8. The optimization system of claim 7, wherein the forward-looking infrared camera includes a capture rate of sixty frames per second with an associated resolution of 320×240 pixels.

9. The optimization system of claim 1, further comprising a robotic arm securing the nozzle to the additive manufacturing device.

* * * * *